(12) United States Patent
Neiman et al.

(10) Patent No.: US 6,604,126 B2
(45) Date of Patent: Aug. 5, 2003

(54) STRUCTURAL DATA PRESENTATION METHOD

(76) Inventors: Richard S. Neiman, 2005 Cypress Creek Rd., Suite 207, Fort Lauderdale, FL (US) 33309; Michael Parsons, 2005 Cypress Creek Rd., Suite 207, Fort Lauderdale, FL (US) 33309

( * ) Notice: Subject to any disclaimer, the term of this patent is extended or adjusted under 35 U.S.C. 154(b) by 41 days.

(21) Appl. No.: 09/681,952

(22) Filed: Jun. 29, 2001

(65) Prior Publication Data

US 2003/0004693 A1 Jan. 2, 2003

Related U.S. Application Data

(63) Continuation of application No. 09/681,461, filed on Apr. 11, 2001.

(51) Int. Cl.[7] .............................................. G06K 9/00
(52) U.S. Cl. ...................... 709/203; 709/201; 709/217; 701/213; 703/7; 717/104; 382/113
(58) Field of Search .................... 709/201, 217–219, 709/203; 382/113; 717/104; 703/1, 7; 701/213

(56) References Cited

U.S. PATENT DOCUMENTS

| | | | |
|---|---|---|---|
| 5,040,240 A | * | 8/1991 | Keegan ...................... 455/260 |
| 5,414,408 A | | 5/1995 | Berra |
| 5,596,652 A | | 1/1997 | Piatek et al. |
| 5,793,882 A | | 8/1998 | Piatek et al. |
| 5,815,417 A | | 9/1998 | Orr et al. |
| 5,958,012 A | * | 9/1999 | Battat et al. |

OTHER PUBLICATIONS

Lonsdale, Mark V., Advanced Weapons Training For Hostages Rescue Teams, Library of Congress Card Catalog No. 88–92351, Los Angeles, California.

Lonsdale, Mark V., Raids: A Tactical Guide to High Risk Warrant Service, L.O.C. Card Catalog No. 91–91417, STTU, Los Angeles, California, 2000.

Lonsdale, Mark V., CQB: A Guide to Unarmed Combat and Close Quarter Shooting, L.O.C. Card Catalog No. 90–92230, STTU, Los Angeles, California, 1999.

Zinna, Kelly A., After Columbine: A Schoolplace Violence Prevention Manual, Spectra Publishing Co., United States, 1999.

Ritchie, Ralph W., Emergency Procedures for Schools, Ritchie Unlimited Publications, Mohawk Vally, Oregon, 1995.

Burke, Robert, Counter–Terrorism for Emergency Responders, L.O.C. Card Catalog No. 99–29184, Lewis Publishers, United States, 2000.

Hylton, J. Barry, Safe Schools: A Security and Loss Prevention Plan, L.O.C. Catalog No. 96–3323, Butterworth – Heinemann, United States, 1996.

Roop, Michael, Vines, Thomas, Wright Richard, Confined Space and Structural Rope Rescue, L.O.C. Catalog No. 97–22071, Mosby Yearbook, Inc., United States, 1998.

* cited by examiner

Primary Examiner—Emanuel Todd Voeltz
(74) Attorney, Agent, or Firm—Anton J. Hopen; Smith & Hopen, P.A.

(57) ABSTRACT

The present invention is a method of processing and displaying structural plans responsive to emergency tactical situations, the method including the steps of receiving a heterogeneous array of structural plan files, establishing a common specification for displaying structural plans, transforming the heterogeneous array of structural plan files to a standardized plan according to the common specification, receiving a remote request for a structural plan relating to a tactical objective, and responsive to the remote request transmitting the standardized plan to a remote recipient.

35 Claims, 24 Drawing Sheets

FIG. 19

Tactical Notes

Add Note

There are 2 tactical notes available for Coral Park Elementary School.

*Date:* 11/04/1995
*Author:* Sergeant Dan Patterson
*Title:* Emergency Entryway
*Article:*

```
There are numerous entryways to this school. This building faces North, so it
will be an easy matter to label the sides:

North - Side 1
West - Side 2
South - Side 3
```

*Date:* 01/12/2000
*Author:* Lieutenant John Davis
*Title:* Hiding Places
*Article:*

```
There are three locations that might be called "hiding places".

1. The main stairwell right off the front door has a large open area under the
stairs. At the time of this report, the cafeteria workers were using this area
to store empty kitchen appliance boxes.
```

Add Note

STRUCTURAL DATA PRESENTATION METHOD

BACKGROUND OF INVENTION

1. Field of Invention

This invention relates to a method of processing and presenting structural data for display, and more particularly, a method for presenting tactical structural plans to remote locations responsive to emergency situations.

2. Background of the Invention

With the rise of violence in the school and workplace has also come increased scrutiny of the methods in which law enforcement and rescue personnel respond to a crisis. In dangerous situations, leaders are not apt to send personnel into unknown situations without some strategic and tactical planning. From the earliest times, maps and plans have been utilized to reduce risk to personnel and achieve predefined objectives.

Where time is available, structural plans may be obtained an analyzed prior to taking action in a crisis situation. However, in reality, plans are typically not readily available when an unexpected crisis occurs. Accordingly, responding personnel are left scrambling to aggregate enough information from a heterogeneous array of sources to develop a plan. During the time in which information is being obtained, severe damage may be inflicted to both life and property.

While numerous references in the prior art acknowledge the problem, none provide a method of presenting tactical structural plans responsive to emergency situations in an efficient and consistent manner.

U.S. Pat. No. 5,815,417 to Orr et al. describes a method for acquiring and presenting data relevant to an emergency incident. The "417 patent describes at least two examples of incorporating architectural plans into the system. However, the uses include (1) visualization of a completed construction plan (Col. 8, lines 40–53); and (2) confirmation of regulatory compliance (Col. 8, lines 54–67).

U.S. Pat. Nos. 5,793,882 and 5,596,652 to Piatek et al. describe a personnel accountability system which also suggests that site information, including floor plans, blueprints, photographs, fire inspection reports and the like, may be obtained by a data receiver (39) for display on a computer hardware system (20). (Col. 8, lines 26–41 of the "882 patent and Col. 7, lines 7–22 of the "652 patent).

U.S. Pat. No. 5,124,915 to Krenzel describes a system for transmitting image information for emergency response situations. The "915 patent describes the use of (1) cellular communications for digital images (Col. 3, line 1 and Col. 5, lines 59–61); (2) compression of images for bandwidth limitations (Col. 3, lines 43–48); and (3) the removal of extraneous information from the display (Col. 5, lines 45–48).

In *Safe Schools, A Security and Loss Prevention Plan*, author J. Barry Hylton notes that in barricaded captor/hostage situations, the "principal and school custodian . . . should offer to the nearest police commander blueprints of the school . . . "(Pg. 171).

In *Raids, A Tactical Guide to High Risk Warrant Service*, author Mark V. Lonsdale notes that when planning a raid, tactical intelligence includes aerial photograph, building plans, direction of door openings (swing of door) and the like. (Pgs. 122–123).

In *After Columbine, A Schoolplace Violence Prevention Manual*, author Kelly A. Zinna recommends that a crisis management kit include blueprints of the school with exit routes clearly marked. (Pg. 83). In *Advanced Weapons Training for Hostage Rescue Teams*, author Mark V. Lonsdales illustrates and describes entry procedures for hostage rescue that are strongly tied to the structure"s floorplan (Pgs. 9, 10, 216–219).

A significant problem in the prior art is the lack of uniformity in structural plans. There are currently no known methods of systematically standardizing the variances between various plan formats, even if they are in digital format and produced by the same design software application. While preexisting structural plans may simply be stored and transmitted to a remote location, there is currently no uniform context to the structural objects nor can they be presented in a uniform manner. Although the above-mentioned references describe the necessity of accessing structural plans to respond to crisis situations, none of the references solve the problem of clearly presenting an array of heterogeneous plans and information to a remote location.

Accordingly, what is needed in the art is a method for emergency response personnel to quickly and consistently access structural information on an area of concern.

There is another need in the art for a standardization process wherein a heterogeneous array of structural data may be processed and displayed in a uniform and accessible fashion.

There is another need in the art for onsite three-dimensional visualization of structural data.

There is another need in the art to provide structural plans to a remote location optimized for an array of tactical objectives.

There is another need in the art for a method for encapsulating logic into standard structural objects to aid in achieving particular tactical objectives.

There is another need in the art to provide an efficient and consistent structural overlay for GPS-based personnel monitoring.

There is another need in the art to provide GPS-based identification of downed personnel with respect to structural plans.

It is, therefore, to the effective resolution of the aforementioned problems and shortcomings of the prior art that the present invention is directed.

However, in view of the prior art in at the time the present invention was made, it was not obvious to those of ordinary skill in the pertinent art how the identified needs could be fulfilled.

SUMMARY OF INVENTION

The present invention includes a method of processing and displaying structural plans responsive to emergency tactical situations, the method comprising the steps of receiving a heterogeneous array of structural plan files, establishing a common specification for displaying structural plans, transforming the heterogeneous array of structural plan files to a standardized plan according to the common specification, receiving a remote request for a structural plan relating to a tactical objective and responsive to the remote request transmitting the standardized plan to a remote recipient. Additional steps may include establishing an array of preselected tactical objectives, establishing an array of relevant objects for each preselected tactical objectives and filtering the array of relevant objects from the standardized plan according to the tactical objective and transmitting the filtered plan to the remote recipient.

A preferred embodiment of the invention includes the steps of establishing an array of reusable structural objects according to the common specification, associating a tactical strategy with at least one object in the array of reusable structural objects, constructing the standardized plan with the array of reusable structural objects and generating a tactical recommendation display to the remote recipient responsive to a display of the at least one object. Additional steps may include calculating a position of the at least one object relative to other objects and generating the tactical recommendation display in view of the position.

An array of dimensions of the object may be calculated wherein the tactical recommendation display is generated in view of the array of dimensions. Exemplary tactical strategies may include providing fire cover, providing pathways for equipment transport, providing utility access or providing containment by lockable doors. For example, where law enforcement or military personnel wish to position themselves within a structure to maximize protection against hostile gunfire, the tactical recommendation display may be a gradient rendered over areas of concern. This creates a topography map of hazardous locations offering the least protection against hostile gunfire. Another example, is where emergency rescue personnel must transport a stretcher to an incapacitated individual. Elevators, stairways, and tight corners may be unable to accommodate the stretcher. Accordingly, the tactical recommendation display comprises warning markers rendered over pathways of insufficient dimensions to transport equipment. If the point-to-point locations are known, the tactical recommendation display comprises a rendered trail over at least one pathway of sufficient dimensions to transport the equipment.

Still another problem in emergency situations involving structures is the identification of utility access points. In the case of a fire, water lines might be a priority. In the case of a hostage situation, communication and power lines might be a priority. Responsive to such a requirement, the tactical recommendation display comprises markers rendered over utility access points.

In many situations, knowing which doors may be locked, unlocked or capable of locking has immense value. If containment of a fugitive or prisoner is sought within a structure, it is beneficial to law enforcement to identify and lock potential escape pathways. Accordingly, the tactical recommendation display may include markers rendered over lockable doors and thus, easily identified. Some facilities such as airports and prisons have the ability to remote lock down areas for security purposes.

This might happen in the event of a terrorist running through the security checkpoint of an airport or in the regular course of a prison"s operation. If such ability exists, a preferred embodiment of the invention includes the steps of establishing a communications pathway from an onsite display device viewing the standardized plan to a corresponding structural facility being viewed by the display device, responsive to a selection of at least one lockable door on the display device, transmitting an instruction to the structural facility to engage or disengage the lock.

To ensure the security and completeness of the structural plans bibliographic data relating to the origin of the heterogeneous array of structural plan files is recorded.

The bibliographic data would typically include date, time, and user tracking information.

In addition to graphical data, alphanumeric data may contain important information in the form of tactical notes, building occupants and the like. Accordingly, additional steps to the current invention may include establishing an array of alphanumeric data related to the structural plan files, associating the alphanumeric data with the structural plan files, and responsive to the remote request transmitting alphanumeric data in addition to the standardized plan to the remote recipient. In a preferred embodiment of the invention, the alphanumeric data is linked in context sensitive fashion to the graphical data wherein alphanumeric data is only displayed in context of associated structural plan data.

The GPS (Global Positioning System) is a "constellation" of 24 well-spaced satellites that orbit the Earth and make it possible for people with ground receivers to pinpoint their geographic location. The location accuracy is anywhere from 100 to 1 meter for most equipment. GPS equipment is widely used in science and has now become sufficiently low-cost so that almost anyone can own a GPS receiver. For tactical situations, GPS equipment provides a unique opportunity. While it is well known in the art to track the location of personnel by receiving their GPS position by wireless communication, the current invention includes the step of receiving an array of GPS coordinates from at least one person inside a facility of which the standardized structural plans are being viewed and displaying the at least one person"s position in overlaying relation to the structural plans on a remote display device. In a preferred embodiment of the invention, additional steps include monitoring the movement of the at least one person as a function of elapsed time, establishing a threshold movement value, periodically calculating a movement value for the at least one person, and responsive to a movement value for the at least one person becoming equal to the threshold movement value, issuing an alert notification. As the current invention provides a standard specification to which different tactical objectives may be applied, an additional step of transmitting tactical data relating to a rescue operation for the at least one person may be executed.

The efficiency and consistency of object-oriented systems is well known in many fields of technology. However, a serious drawback to the current prior art is the inconsistency of architectural plans. It is unlikely that two skilled draftsmen will select the exact same settings, layers or descriptions when constructing a structural plan. However, in order to consistently display, manipulate and apply intelligence to structural data, it must be standardized into a common format, which is disclosed above. Additional steps to the current invention include establishing an array of reusable structural objects according to the common specification, constructing a standardized plan from the heterogeneous array of structural plan files with the array of reusable structural objects according to the common specification, establishing an array of preselected tactical objectives, establishing an array of relevant objects for each preselected tactical objectives, and filtering the array of relevant objects from the standardized plan according to an individual tactical objective.

Dynamic intelligence may be added to the system by the steps of aggregating an array of data relating to at least one structure, establishing a common specification for displaying structural plans, establishing an array of objects according to the common specification, encapsulating a logic function in at least one object of the array, formatting the array to the common specification, storing the array on a remotely accessible storage device, responsive to a request, transmitting the array to a remotely located display device, and executing the logic function associated with an identified tactical objective. The logic function may also be responsive to GPS data. For example, logic applied to a doorway object establishes angles of cover from gunfire according to the position of the doorway object in relation to the room. From the calculated angles, a display image may be modified to clearly illustrate areas that provide maximum cover from gunfire. However, the same object may also have emergency rescue logic encapsulated therein to mark doorways of sufficient width to pass rescue equipment through.

The invention also provides for a computer program product for processing and displaying structural plans responsive to emergency tactical situations comprising a computer-readable medium, a data storage module stored on the medium, that couples to an array of digital files relating to at least one structure, a data conversion module communicatively coupled to the data storage module to format the array of digital files into a common specification, a network reception module communicatively coupled to the data storage module to receive requests for the array of digital files, and a network transmission module communicatively coupled to the network reception module to transmit the array of digital files. A security module may be communicatively coupled to the reception module to validate to the identity of the entity requesting the array of digital files. A GPS reception module may be included to receive dynamic positioning of a person and monitor the person"s movement as a function of time. A GPS alert module may be provided to issue an alert if the person fails to move a sufficient distance during a preselected period of time. A GPS transmission module may also be included to transmit the position of the person relative to the structure defined by the array of digital files.

It is therefore an object of the present invention to provide a method for emergency response personnel to quickly and consistently access structural information on an area of concern.

It is another object of the present invention to provide a standardization process wherein a heterogeneous array of structural data may be processed and displayed in a uniform and accessible fashion.

It is another object of the present invention to provide a method for onsite three-dimensional visualization of structural data.

It is another object of the present invention to provide structural plans to a remote location optimized for an array of tactical objectives.

It is another object of the present invention to provide a method for encapsulating logic into standard structural objects to aid in achieving particular tactical objectives.

It is another object of the present invention to provide an efficient and consistent structural overlay for GPS-based personnel monitoring.

It is another object of the present invention to provide GPS-based identification of downed personnel with respect to structural plans.

It is to be understood that both the foregoing general description and the following detailed description are explanatory and are not restrictive of the invention as claimed. The accompanying drawings, which are incorporated in and constitute part of the specification, illustrate embodiments of the present invention and together with the general description, serve to explain principles of the present invention.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which:

FIG. 19 is a screen capture of a tactical notes screen.

DETAILED DESCRIPTION

Figure 1:
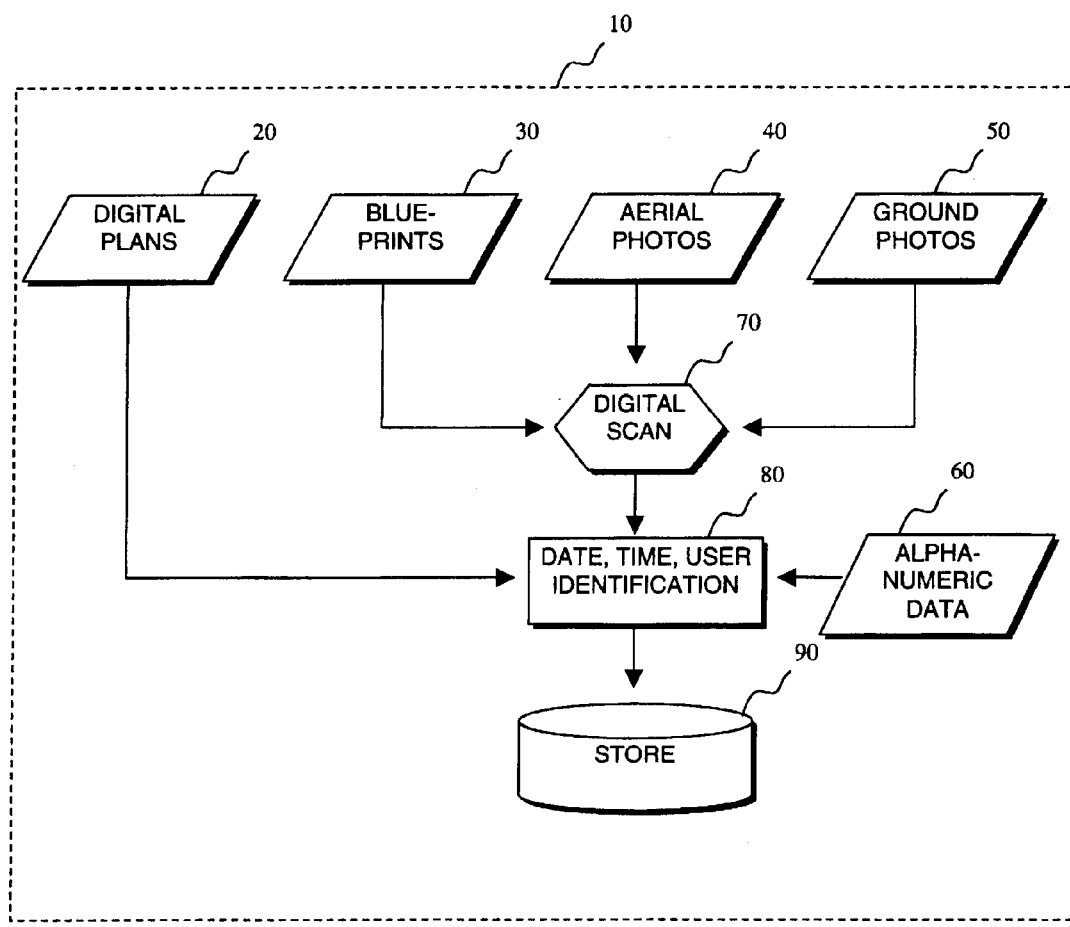
FIG. 1 is a flowchart diagram of the data retrieval and storage process according to the invention.

FIG. 1 shows the preliminary data processing 10. If digital plans 20 are provide, then little more is needed other than to save it to a data store 90. Upload data 80 is associated with the plans include date, time, user identification and notes about the plans. If the data is received in non-digital format which may commonly occur with blue-prints 30, aerial photos 40 and ground photos 50 a digital scan 70 processes the information into machine-readable format. Written documents are scanned into bitonal format. Blueprints and "black and white" aerial photographs are scanned into grayscale format. Pictures and color aerials are scanned into full-color format. All files are then uploaded into the data store 90 after being stamped with time, date and user information 80. In the case of a school, for example, faculty data is mostly textual data (alphanumeric) 60 which is stored in the data store 90. Predefined templates request information about the principal, vice-principal, deans, resource officers, and any other building official.

Figure 2:
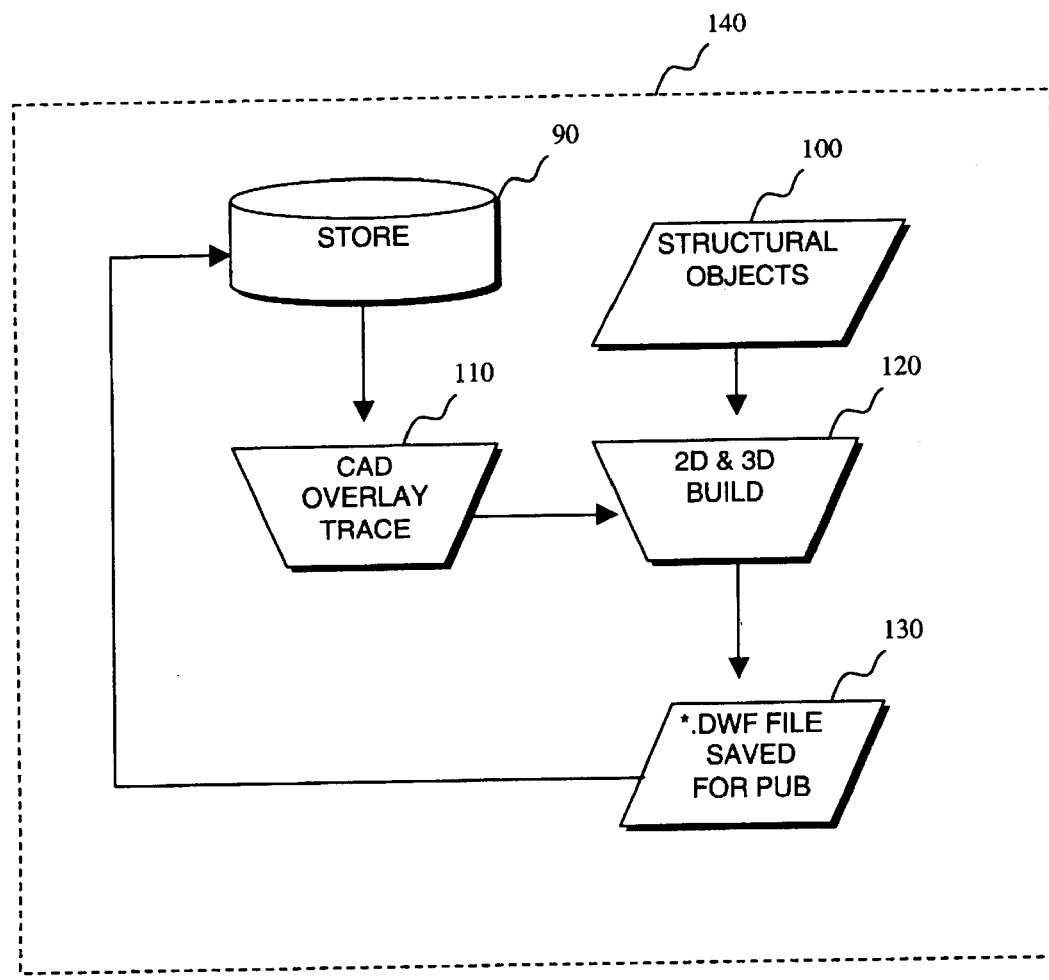
FIG. 2 is a flowchart diagram of the process according to the invention to standardize structural plans according to a common specification.

FIG. 2 shows the standardization process according to a preferred embodiment of the invention. The data store 90 is accessed to bring up preexisting structural plans. Because of the high degree of variance between drafting techniques, a common specification must be established for manipulating the displaying the structural plans. There are currently no known solutions capable of automatically standardizing the variances between various plan formats, even if they are in digital format and produced by the same design software application such as AutoDesk"s well-known AutoCAD® series. Accordingly, structural plans are manually recreated using AutoCAD® Architectural Desktop with AutoDesk CAD Overlay. All floor plans are retrieved from the data store 90 as images. The images are then scaled and oriented so that they match up with the proper dimensions of the real structural plans. Structural objects are then traced 110 on top of the image in a "heads-up" drafting environment. The components are provided from a store of reusable structural objects 100. The structural objects may include doors, windows, stairwells or the like. The scaling of the new, clean plan is typically accurate enough for emergency schematics, but not accurate enough for construction documents. As the objects of the plan are traced in, AutoCAD® Architectural Desktop or an equivalent application places objects in both 2 dimensional space as well as 3 dimensional space 120. After the tracing has been completed the system automatically creates a standard file such as a .DWF for later publication to the data store 90. An important benefit of the standardization process is not just appearance, but of functionality. Because data integrity may be maintained across as plurality of standardized objects, logic may be later applied to the objects according to the needs and objectives of the user.

Figure 3:
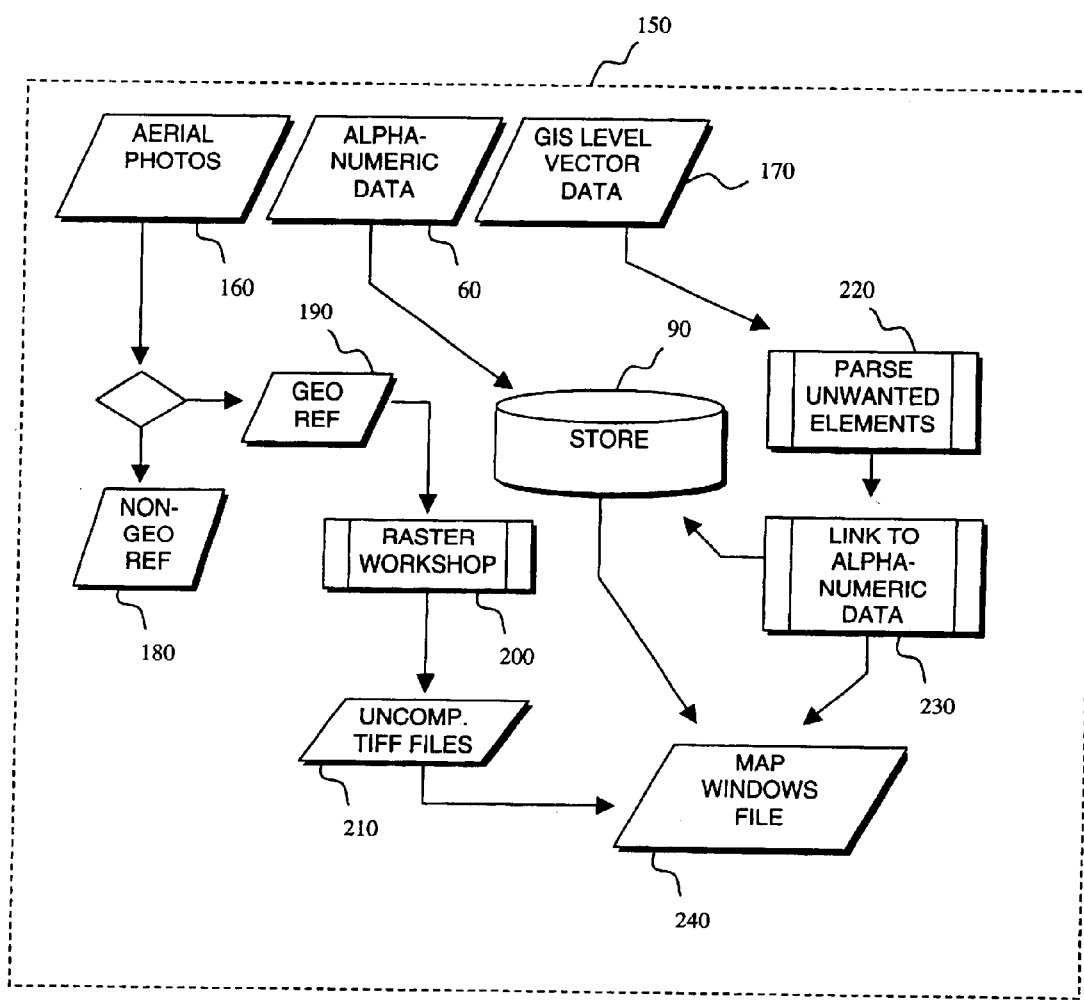
FIG. 3 is a flowchart diagram of the process according to the invention to transform a heterogeneous array of data into a standardized plan according to a common specification.

In FIG. 3, site plan data comprises aerial photographs 160, alphanumeric data 60, and GIS level "clean" vector data 170. Most site plan information will already be in this format, but some standardization of the data might be required. There are two types of aerial photographs georeferenced 190 and non-georeferenced 180. Non-georeferenced will not show up on the site plan but will instead be handled as photographic data which is discussed below. Georeferenced imagery may be run through a MapGuide software component sold by AutoDesk® under the brand name Raster Workshop 200 or an equivalent application. This program takes imagery in almost any format and converts it to uncompressed tiled TIFF files 210. Vector data 170 is parsed for unwanted elements 220 and linked 230 to alphanumeric data 60. The resultant AutoCAD Map drawing is translated to .SDF files. AutoDesk® MapGuide Author combines the vector data the alphanumeric data and the raster data into one single Map Windows File (.MWF).

Photographic data is published using one of two formats. The first format is JPEG. JPEG is an industry standard that all web browsers support natively. JPEG files are appropriate for smaller images. For larger images, browser download time will be significant so in order to reduce the wait to end users, a streaming imagery format will be used. The preferred format is Enhanced Compression Wavelet (ECW). ECW is a streaming imagery format used in Earth Resource Mapping"s Image Web Server. In order to translate to these formats, Earth Resource Mappings ER Mapper is used. ER Mapper is a robust imagery manipulation application that, among other things, supports batch translation. It also supports image mosaicing and balancing. These are important issues when many gigabytes of imagery come in and need to be translated.

Figure 4:
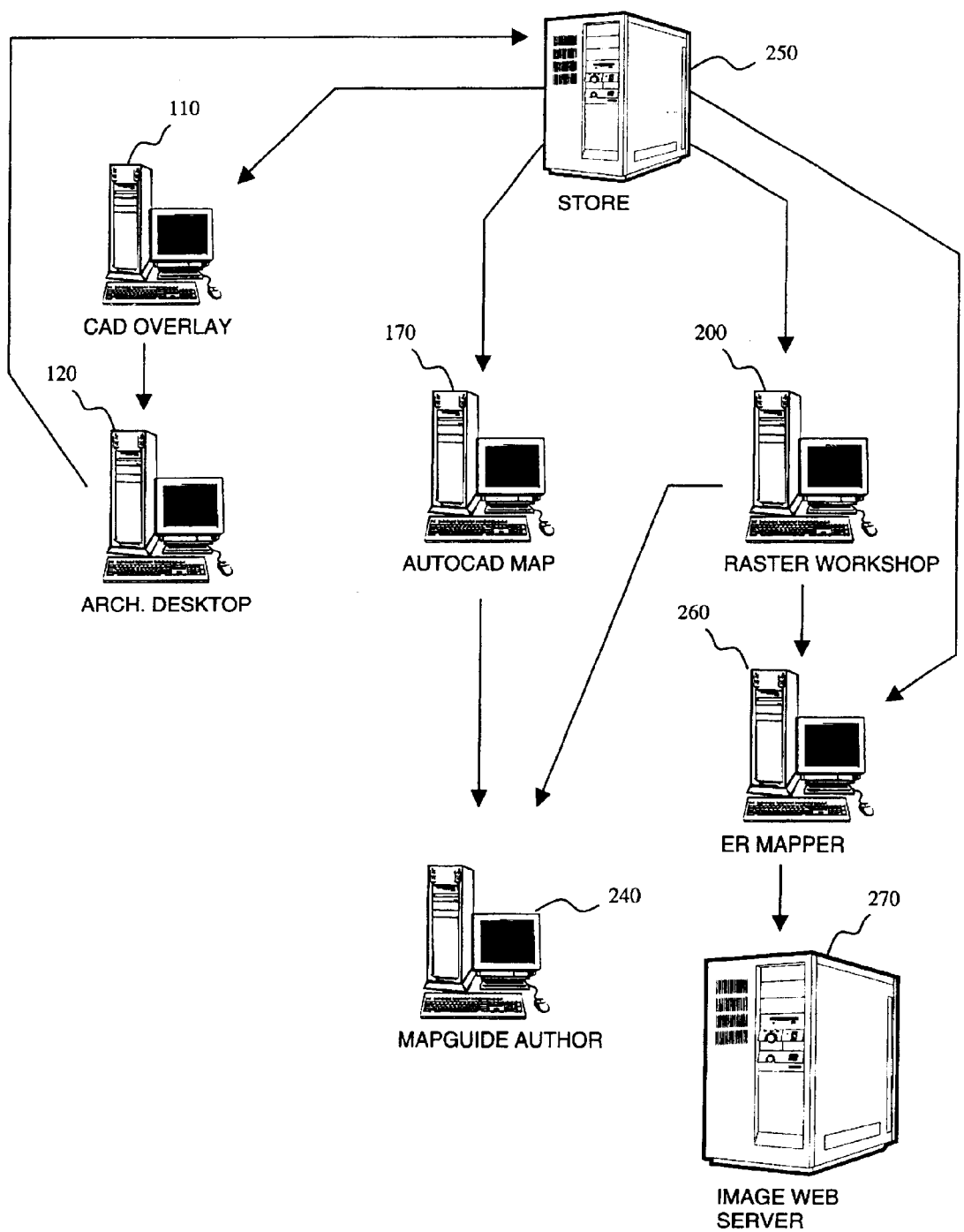
FIG. 4 is a flowchart diagram of the utilization of commercially available software applications to enable the standardization processing according to the invention.

FIG. 4 is an overview of some commercially available software applications that may be utilized in carrying out the invention. A database server 250 may simply be known as a "content store" in the art. Well-known database servers may include Oracle 9i, Microsoft SQL 2000, IBM DB2, Informix, or the like. AutoCAD Architectural Desktop 120 is the core program for processing floor plans. No matter what format they were originally in, Architectural Desktop is used to re-create the floor plans in a format that is clean, legible, and publishable on a remotely accessible device. Architectural Desktop supports creating schematic floor plans in 2D, 3D, or both. In a preferred embodiment of the invention, developers see a standardized AutoCAD interface with specific options for the things that emergency services personnel are interested in. These include walls, doors, windows, stairs, etc. The interface is standardized using Visual LISP and Visual Basic programming languages.

CAD Overlay 110 s the program that gives AutoCAD the ability to do advanced work with imagery. As floor plans are almost always coming into AutoCAD as scanned blueprints, this is a necessary component for scaling and aligning said blueprints. CAD Overlay appears as simply another pull-down menu in AutoCAD.

Raster Workshop 200 takes imagery in almost any format and converts it to uncompressed tiled TIFF files. This standardizes an array of heterogeneous graphic formats into one useable format.

ER Mapper 260 is the program used to process imagery for Internet publishing. Often times, imagery comes in as many different images that need to be tiled together. ER Mapper is used to translate all imagery to the Enhanced Compression Wavelet (ECW) file format. This is the format used by Image Web Server 270 of FIG. 5 to publish images over the Internet.

AutoCAD Map 170 filters out any unwanted elements and links to alphanumeric data. The resultant AutoCAD Map drawing will then be translated to .SDF files.

MapGuide Author 240 is where the actual Map Windows Files (.MWFs) are made. These are basically text files that are authored to call certain resources at certain times. The invention contains a standard site plan template that can be used for most site plans.

Figure 5:
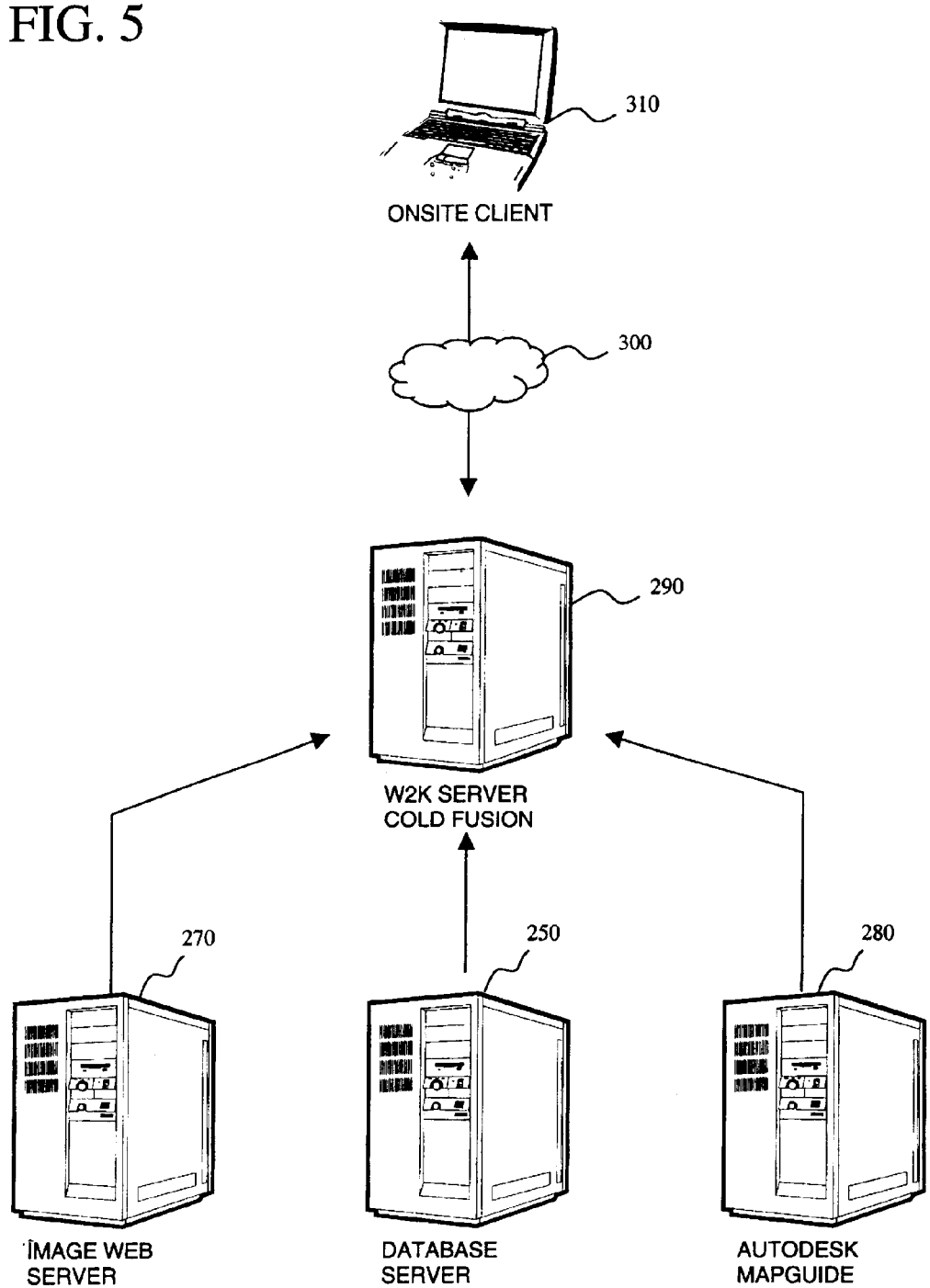
FIG. 5 is a flowchart diagram of the utilization of commercially available software applications to enable the delivery of content to a remote location according to the invention.

In FIG. 5, an online client-display device 310 is provided in communication with a network pathway 300 to a Windows 2000 IIS server running Allaire ColdFusion Server software 290. The network pathway 300 might be a local area network connection (LAN) or a wide area network connection (WAN) which typically encompasses communications made through the Internet. The ColdFusion Server software provides a development environment and programming language for rapid deployment of database-driven web applications. Alternatives to ColdFusion may include Microsoft"s Active Server Pages with database connectivity through its ADO system, CGI executables, Perl applications, ISAPI DLLs and the like.

Image Web Server 270 is an efficient application for viewing large images over the Internet. The present invention preferably uses Image Web Server for all photos over 500×350 pixels. This size is the "sweet spot" for at what point a complete JPEG download is too slow for a wireless Internet connection. Image Web Server streams large images to the browser rather than trying to send the whole thing at once. This technology is ideal for aerial photos and larger site photos. Image Web Server files are embedded in web pages as a window where large image files pixelate and sharpen while the end-user navigates (panning and zooming) around the image.

The database server 250, as described above, is preferably an efficient data store according to well-known database principles. AutoDesk MapGuide 280 is a geoinformation server. It allows for input from many different data sources including AutoCAD drawings, ArcView shape files, AcrInfo coverages, MapInfo files, and several others. It is known as an efficient application to publish spatial information on the Internet. The current invention may use MapGuide to publish site plans of buildings. MapGuide may include a primary navigation screen for the current invention. The end user will see MapGuide as a window where data rich maps show up and navigation (panning and zooming) is possible.

It should be noted that server applications may reside on separate computers or may multitask together on a single computer depending on load requirements. For mission critical applications, server clusters are preferred and all data stores should be mirrored to remote locations, particularly in the event of large-scale disasters that might disrupt a single-site system.

As wireless bandwidth is finite, a preferred embodiment of the invention will utilizes client-side and server-side processing judiciously. Accordingly, it is preferred that the display of floor plans on the onsite client 300 be rendered by AutoDesk WHIP!®.WHIP!® uses the drawing web format (DWF), a lightweight vector file format that preserves the security and precision of original DWG drawing files, while ensuring the efficient transmission of drawings. Alternatively, if a client display device does not have the processing power required to render the vector data, static images may be generated on the server side and then transmitted to the device such as a PDA or cellular telephone. Interface displays may be presented through a standard web browser such as Microsoft"s Internet Explorer or Netscape"s Navigator.

Figure 6:
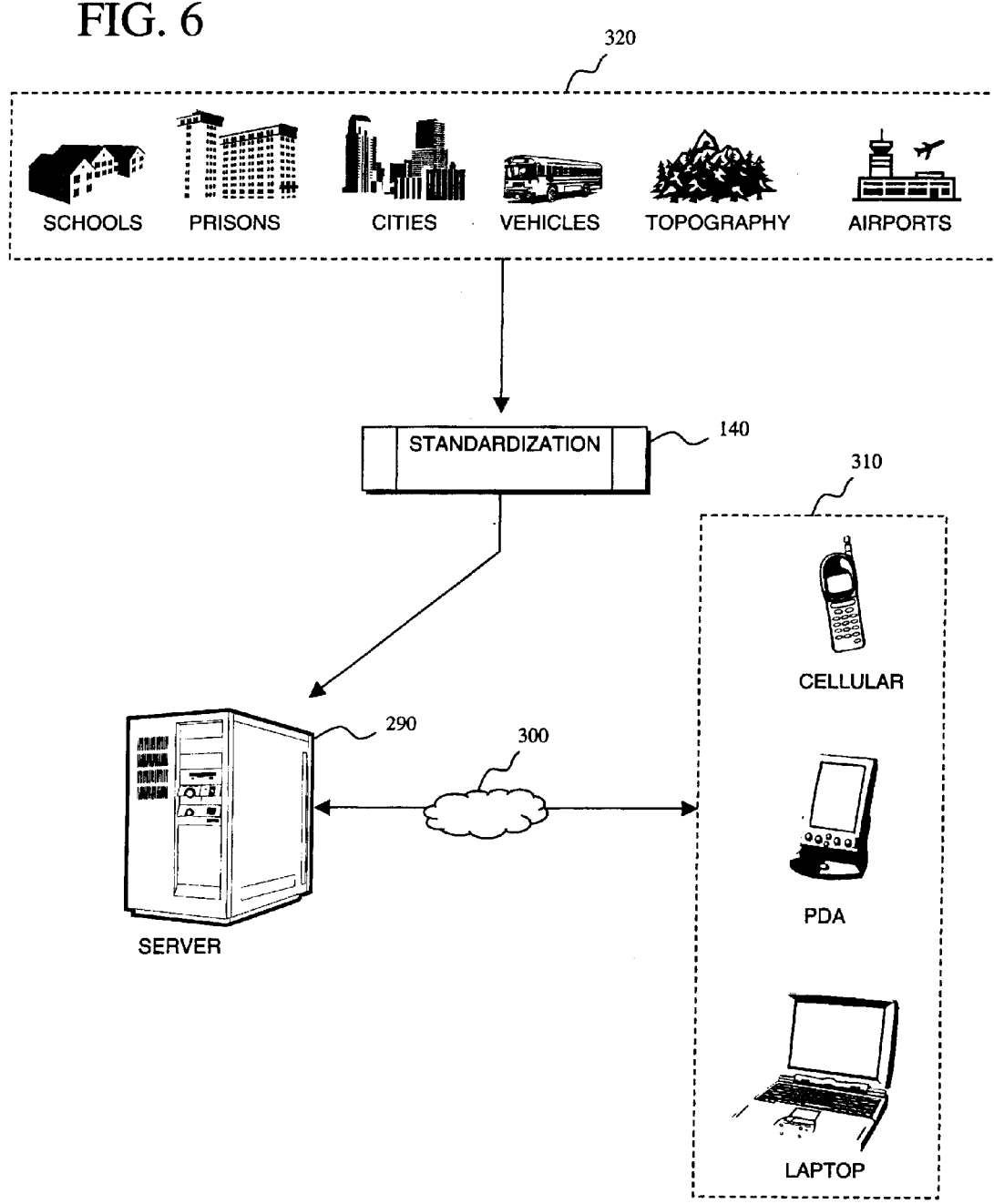
FIG. 6 is a flowchart diagram of the delivery of content relating from a variety of sources to portable devices through a standardization process

FIG. 6 illustrates the general process of the invention for a wide range of potential applications. Occurrences of school violence are unfortunately common place and such structures are generally unfamiliar to responding police departments and rescue personnel. Prisons require an extremely high degree of security and prison riots may require entry of the facility by law enforcement that do not know the layout. Both natural disasters and terrorist activities may threaten a city as a whole. Hostage situations may take place on ships, airplanes, buses and the like. Knowing the layout of such vehicles provide an essential advantage to responding personnel. Strategies for fighting forest fires can be greatly improved by visualizing the topography and manmade structures put at risk by the fire. Airports are generally large, complex structures that require a high level of security. Individuals have been known to run past security checkpoints gaining access to aircraft. Structural data 320 is submitted to a standardization process 140 and then made accessible via a content store 290 by remotely located display devices 310 over a network connection 300. The remotely located display devices 310 may include, but are not limited to, cellular telephones, PDAs and notebook computers.

Figure 7:
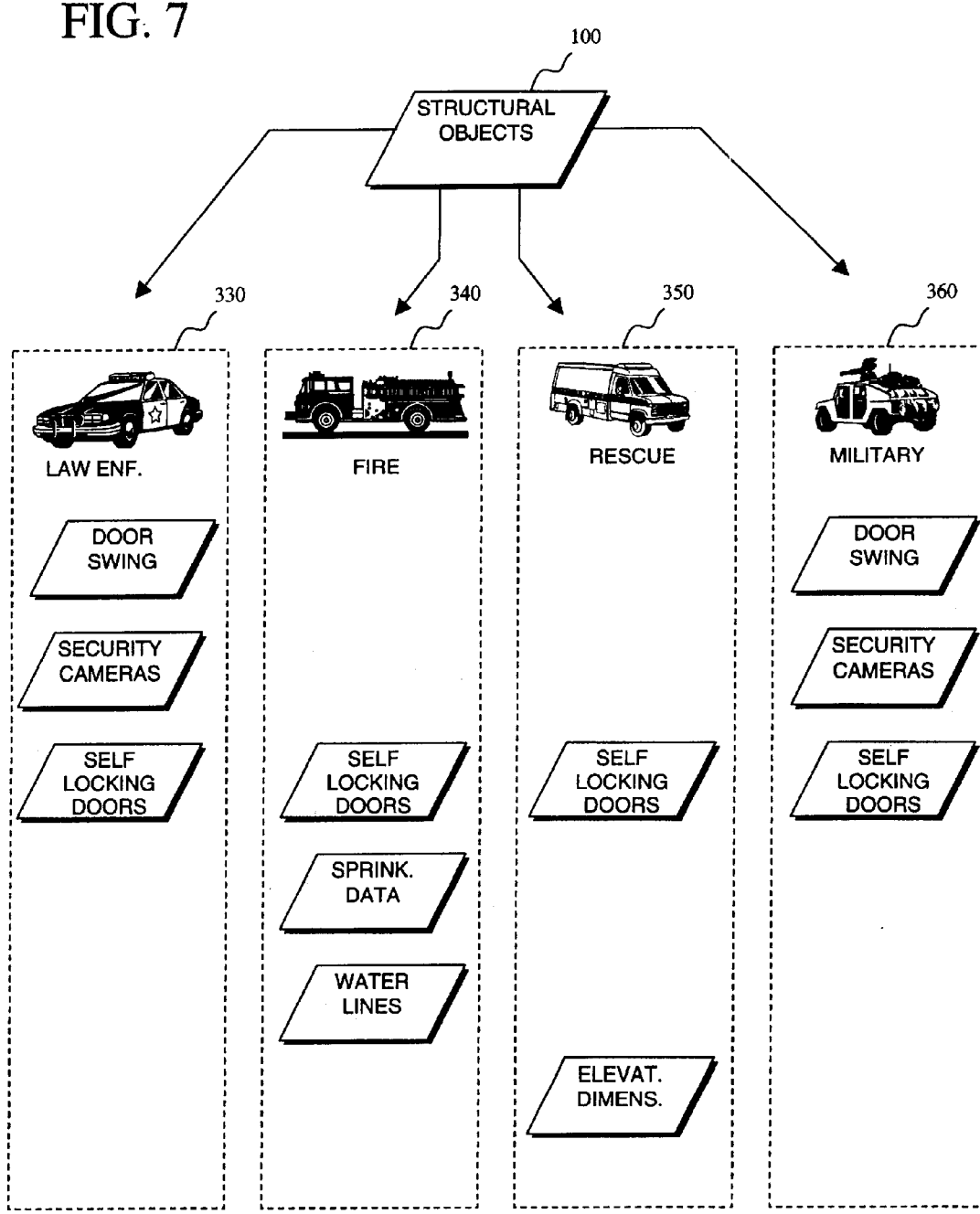
FIG. 7 is a flowchart diagram of structural object applications according to the invention.
Figure 8:
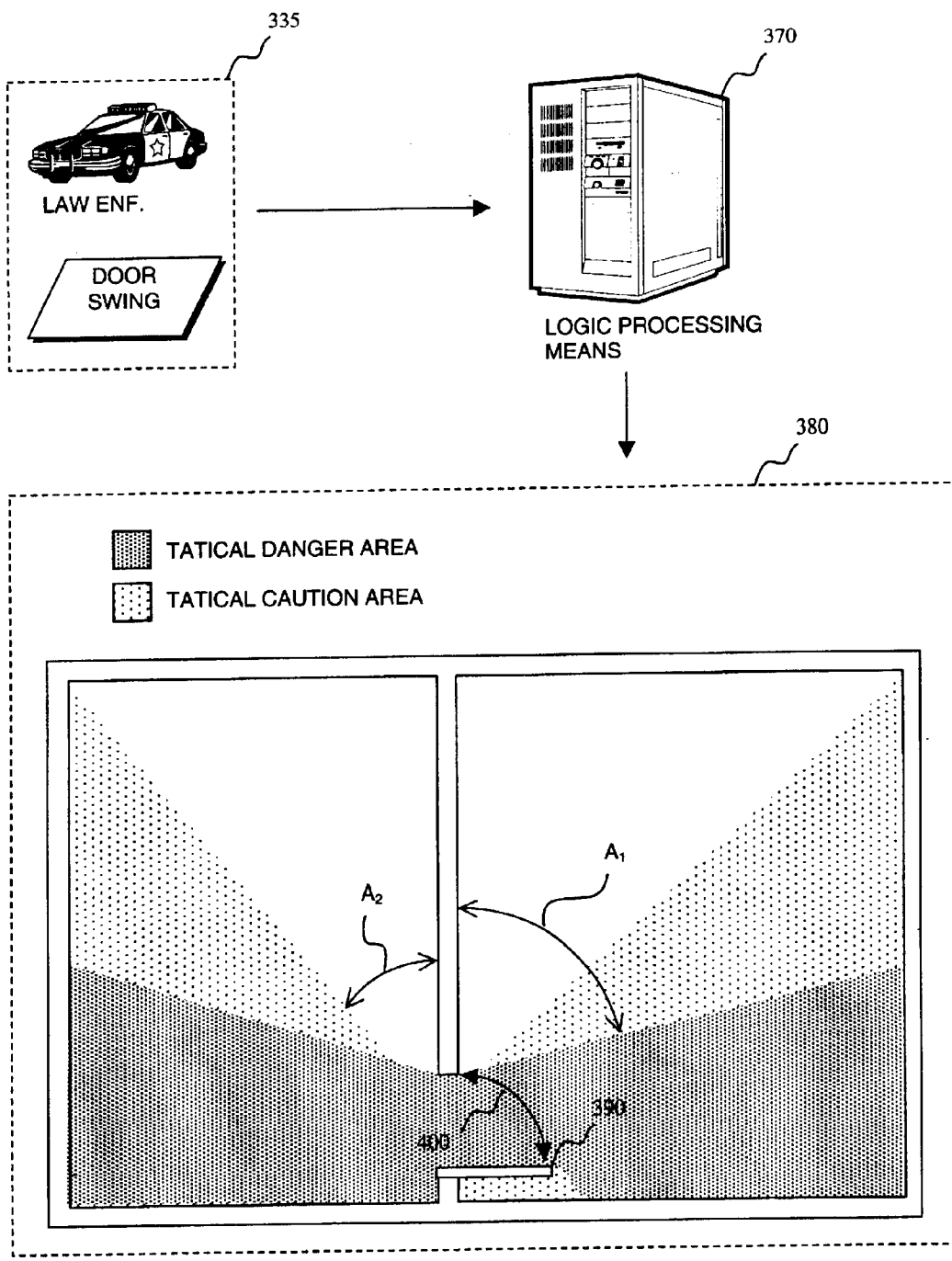
FIG. 8 is a flowchart diagram illustrating the execution of object encapsulated logic for a specific tactical objective.

FIG. 7 illustrates an important benefit of the standardization process. Structural objects 100 may be optimized for predefined tactical objectives. For example, law enforcement objects 330 might include door swings, security camera locations, and self locking door controls. Fire fighting objects might also include sprinkler data and water line locations. Rescue objects 350 might require additional focus on the dimensions of elevators to determine whether patients may be transported therein. It can also be seen that many objects might have common application across several tactical objectives. In FIG. 8, a door swing object 335 contains an encapsulated logic function to resolve areas in a floor plan that provide varying levels of cover from hostile gunfire. The logic function is applied by a logic processing means 370 and the resultant display 380 provides a shading gradient according to the logic. The logic may be applied by identifying the location of the door 390 with respect to the open area surrounding it. The swing of the door 400 is identified. From the opening of the door, two angles, $A_1$ and $A_2$ are calculated and used to determine the geometric boundaries of the shading gradient.

Figure 9:
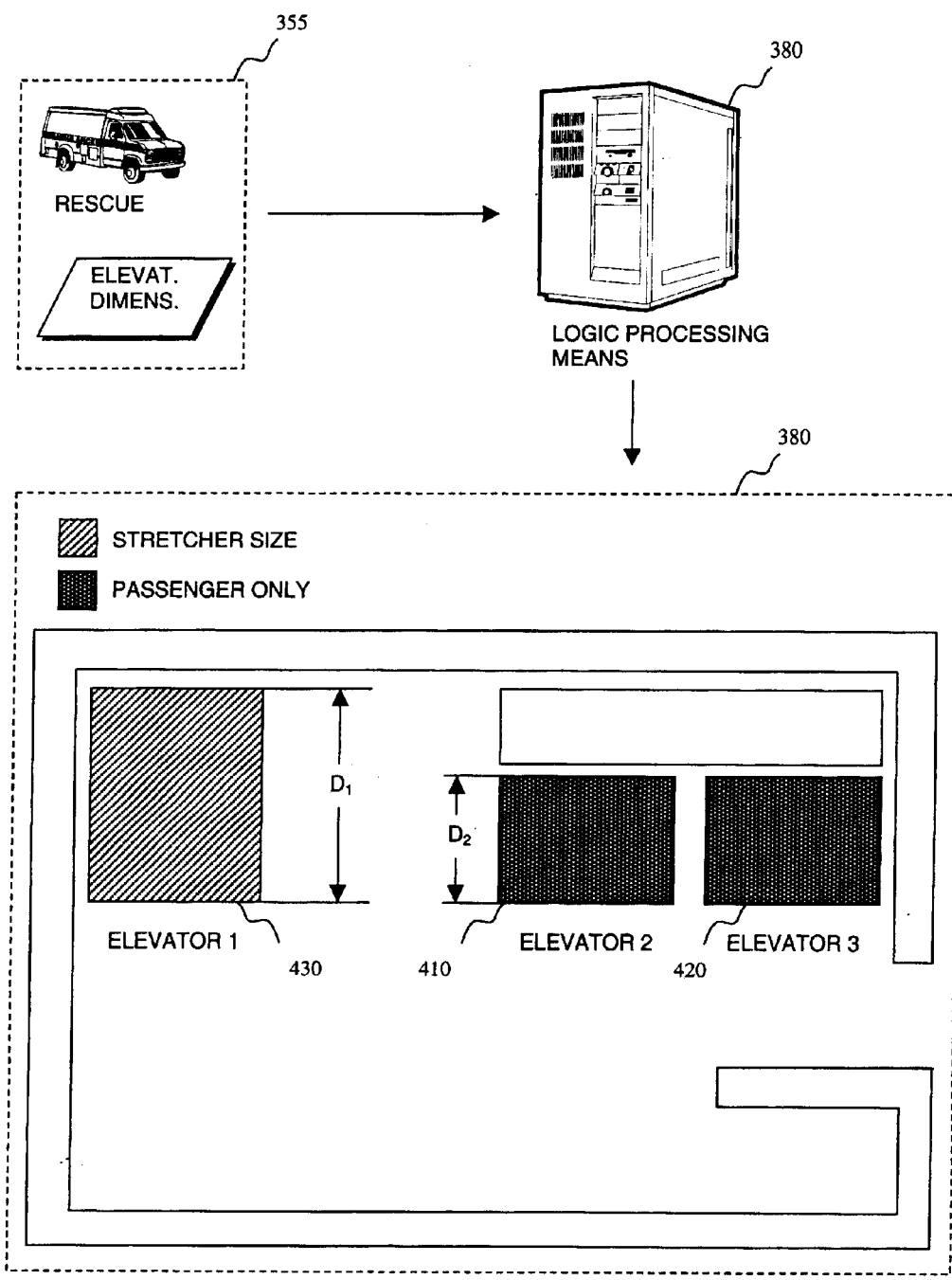
FIG. 9 is a flowchart diagram illustrating the execution of object encapsulated logic for a specific tactical objective.

Another example of a logic function is illustrated in FIG. 9. An elevator object 355 contains an encapsulated logic function to resolve whether a standard ambulance stretcher will fit into an elevator. The logic function is applied by the logic processing means 370 and the resultant display 380 highlights the elevator 430 capable of transporting the standard ambulance stretcher while also identifying the elevators 410 and 420 which are incapable of accommodating the stretcher. The elevator dimensions $D_1$ and $D_2$ are measured against a threshold value for the stretcher.

It should be noted that the logic may be applied according to the tactical objective sought. Therefore, elevator dimensions might be meaningless to a SWAT team but critical to medical personnel. Alternatively, the location of security cameras might be important to the SWAT team but irrelevant to the medical personnel. Accordingly, what may initially begin as a military operation may quickly become a medical rescue operation as well. Therefore, by encapsulating the logic into each object, new views may be immediately presented to the appropriate personnel according to the type of information they require.

Figure 10:
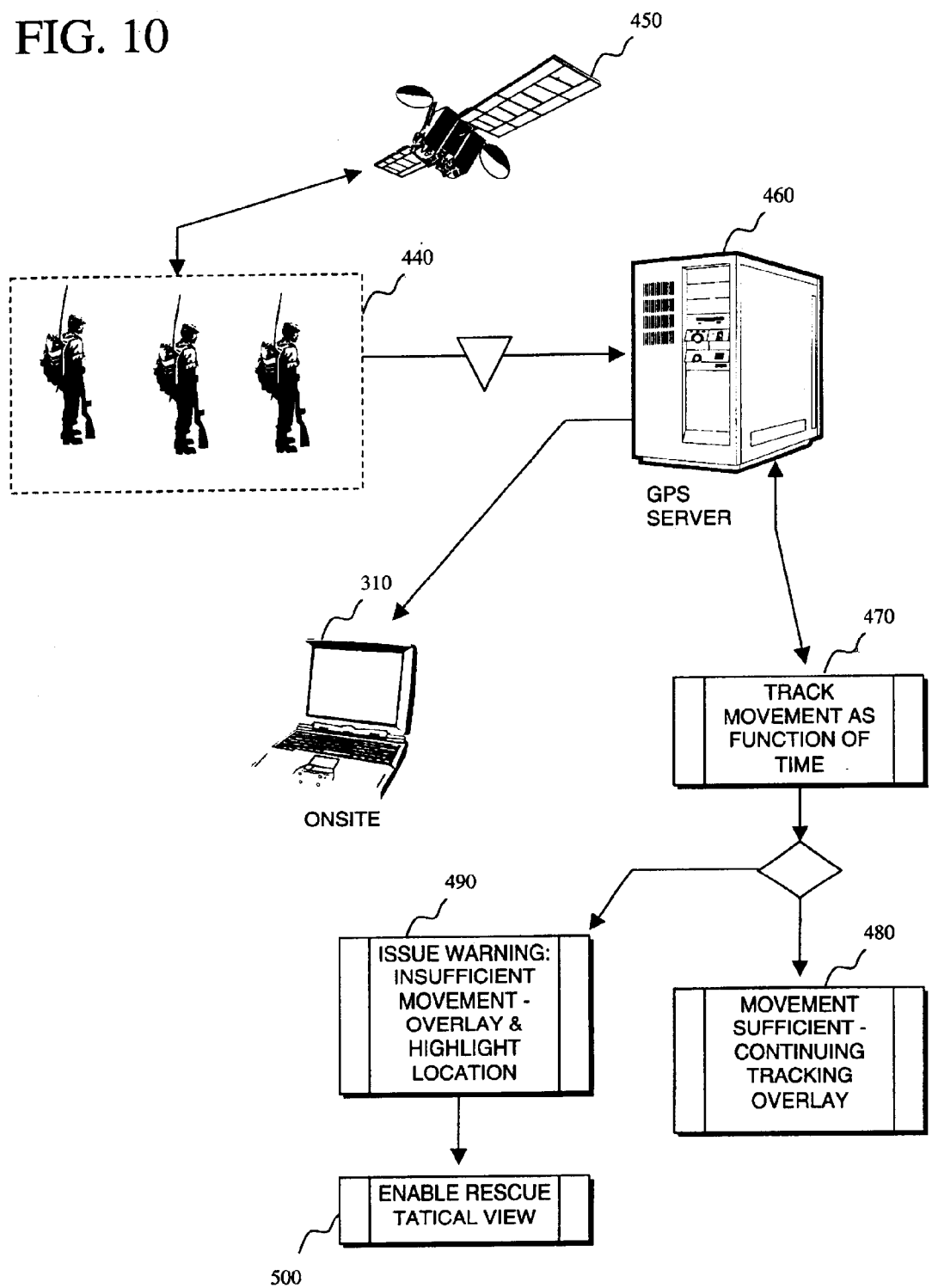
FIG. 10 is a flowchart diagram illustrating the application of GPS data to the current invention.

Virtually all modern PDAs, notebook computers and recently cellular telephones have GPS capability. In FIG. 10 GPS-enabled personnel 440 retrieve positioning data from satellite 450 communication. The position data is then relayed wirelessly to a GPS relay 460 and the position of the personnel 440 may be displayed in overlying relation to the structural plans on the remote display device 310. In a preferred embodiment of the invention, the GPS positioning data for each individual is tracked as a function of time 470. If the relative movement of the individual is sufficient, the tracking continues as normal 480. However, if insufficient movement is detected 490, an alert notification is issued and a rescue tactical view is enabled 500 on the remote display device 310.

Figure 11:
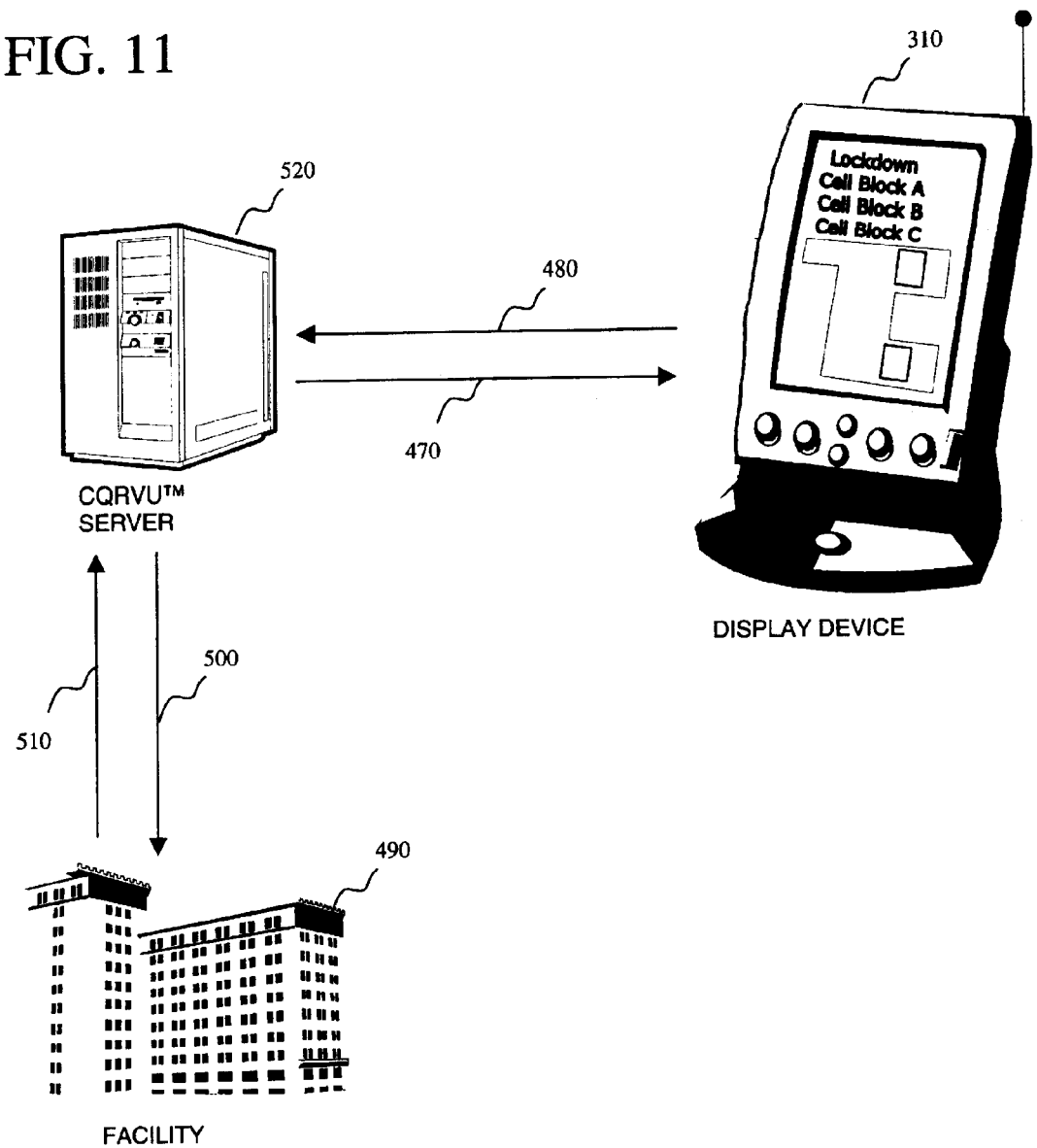
FIG. 11 is a flowchart diagram illustrating the remote control of lockable doors according to the invention.

In FIG. 11, a lockdown method of the current invention is provided. The remote display device 310 receives structural plans 470 from an authentication server 520. Remotely lockable doors are highlighted on the display device 310 and end-user selection transmit a lock instruction 480 from the remote display device 310 to the authentication server 520 which in turn transmits an authenticated lock instruction 500 to the facility 490. The facility 490 then confirms the success of the instruction 510 back to the authentication server 520 which is then passed back to the remote display device 310.

Figure 12:
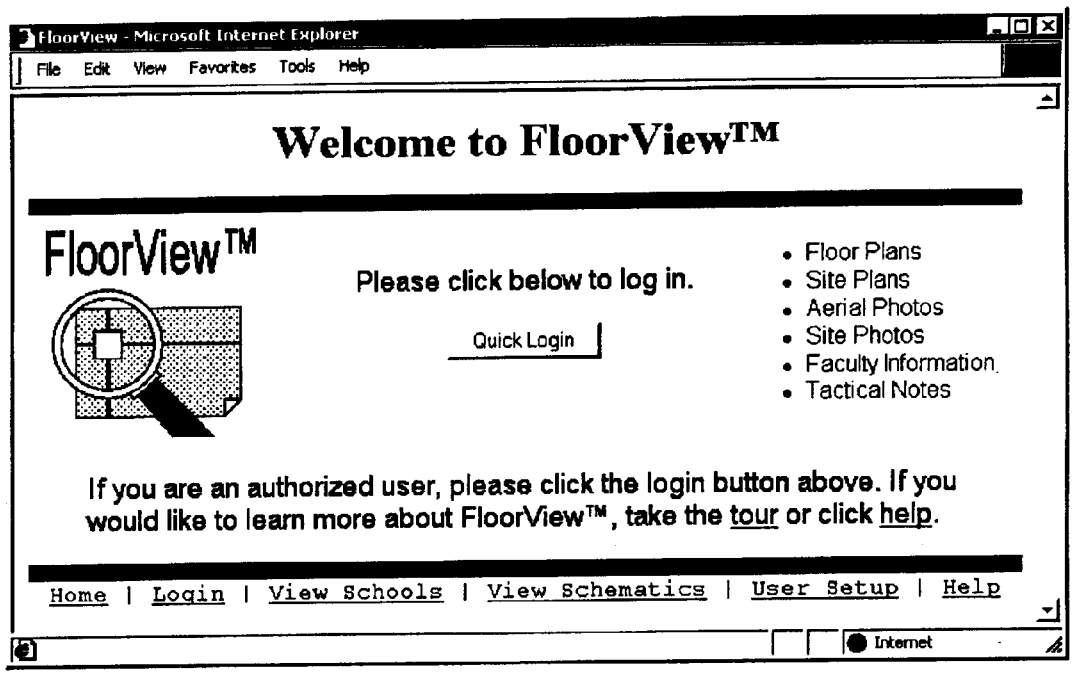
FIG. 12 is a screen capture of a home page for an embodiment of the invention tailored to schools.
Figure 13:
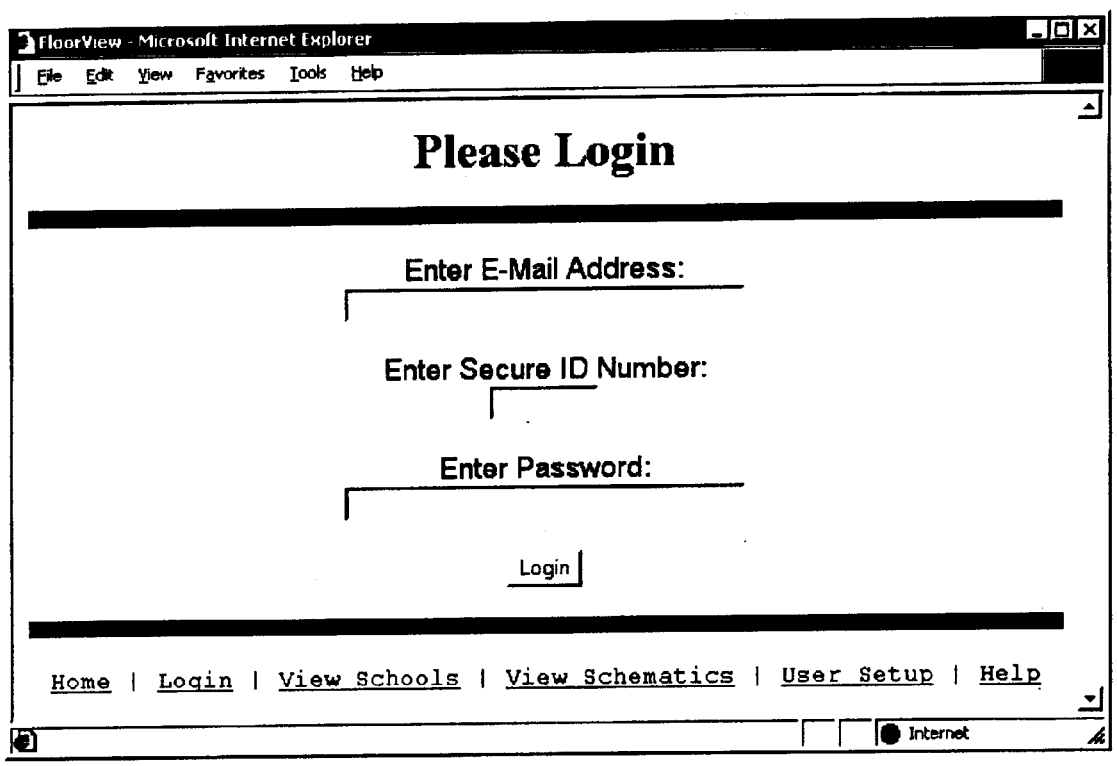
FIG. 13 is a screen capture of an empty login screen.
Figure 14:
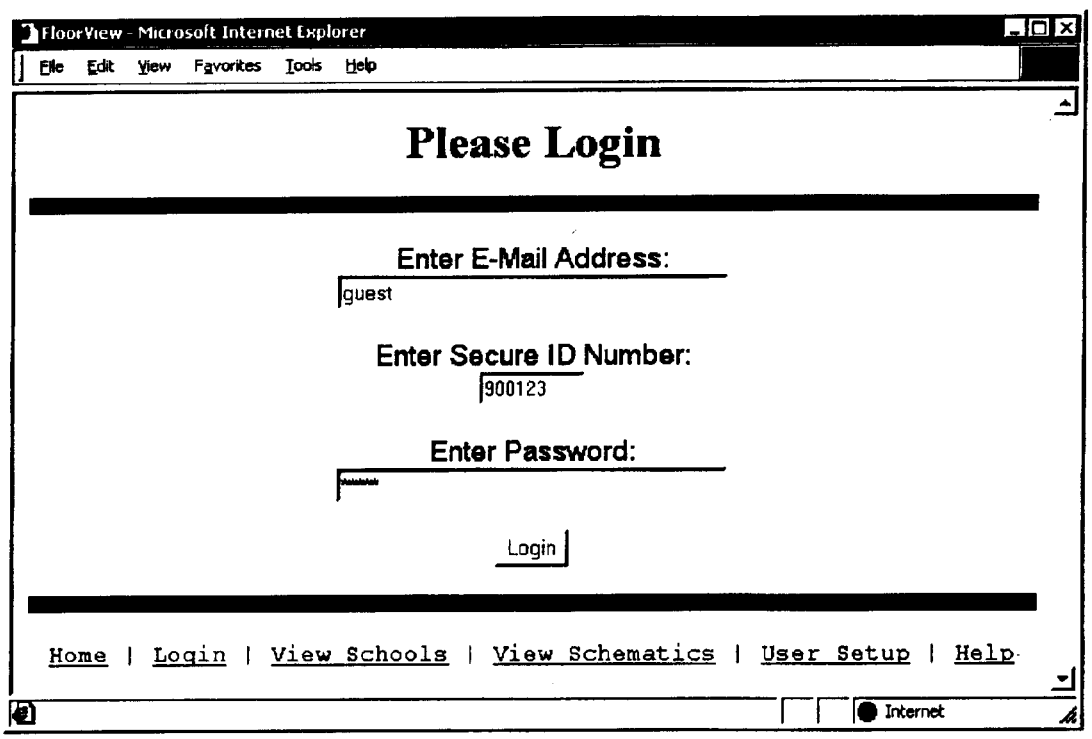
FIG. 14 is a screen capture of a populated login screen.
Figure 15:
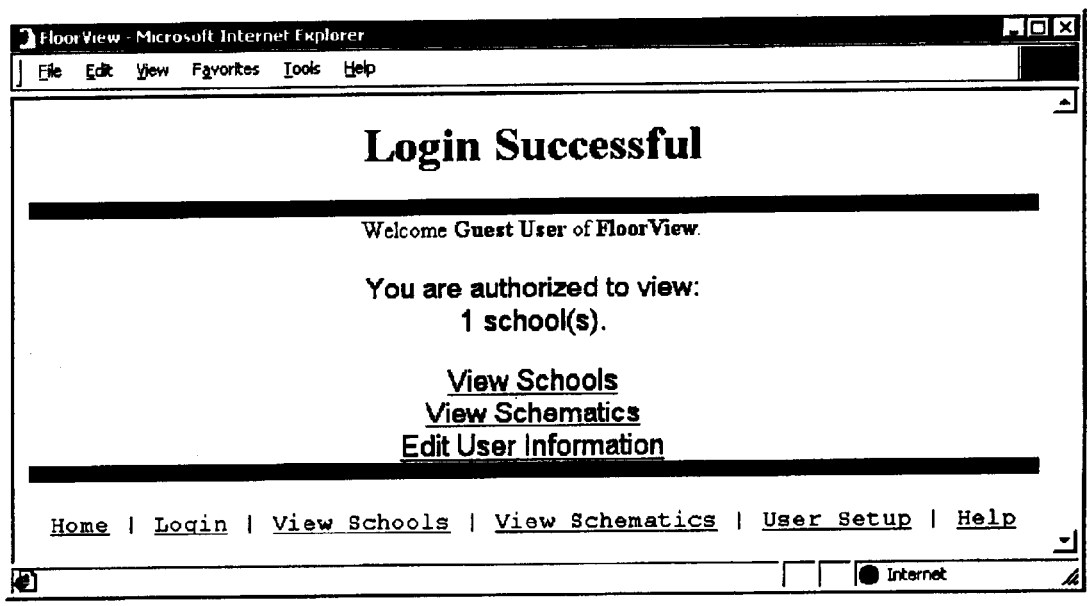
FIG. 15 is a screen capture of an interface display for an authenticated user authorized to view one school plan.
Figure 16:
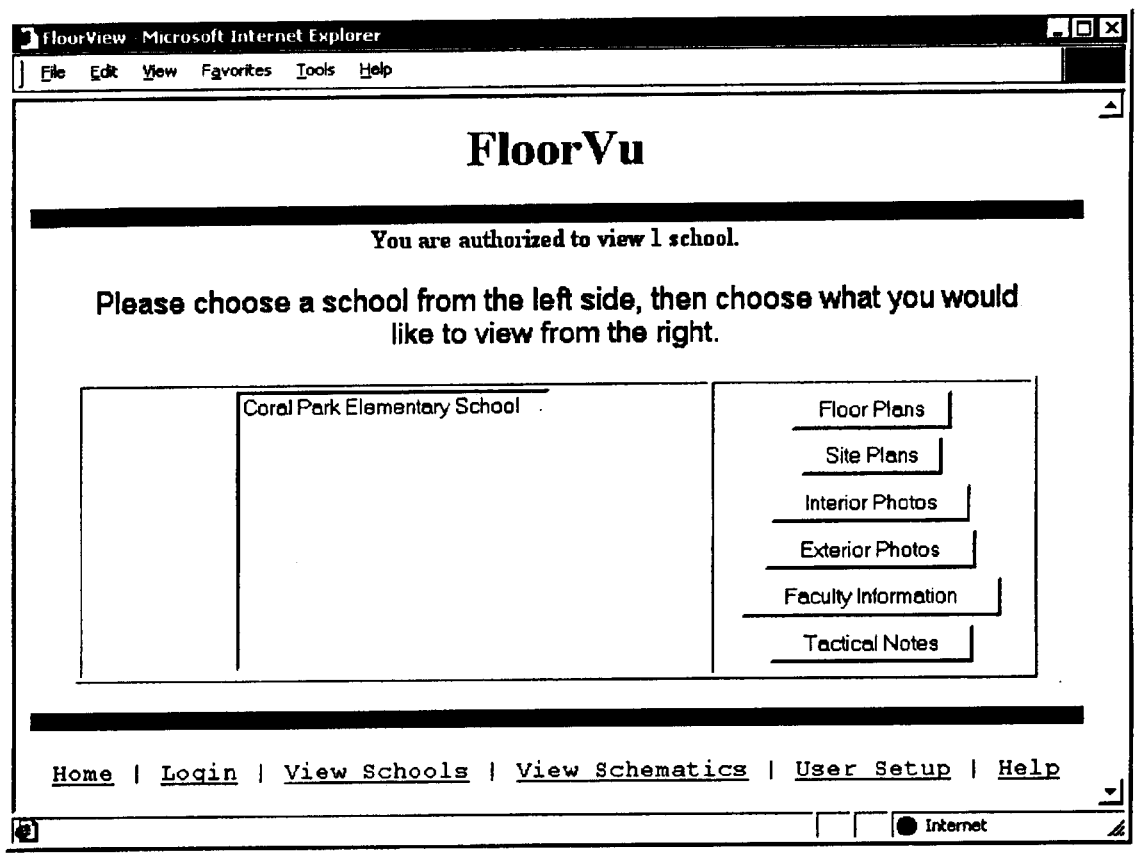
FIG. 16 is a screen capture of a menu for viewing information relating to an elementary school.
Figure 17:
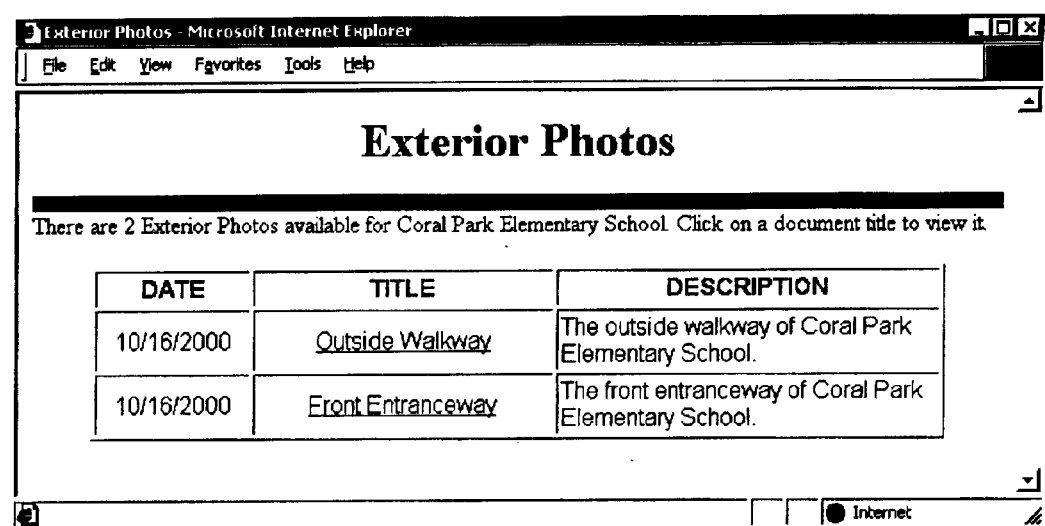
FIG. 17 is a screen capture of an exterior photo list screen.
Figure 18:
FIG. 18 is a screen capture of a faculty information screen.
Figure 20:
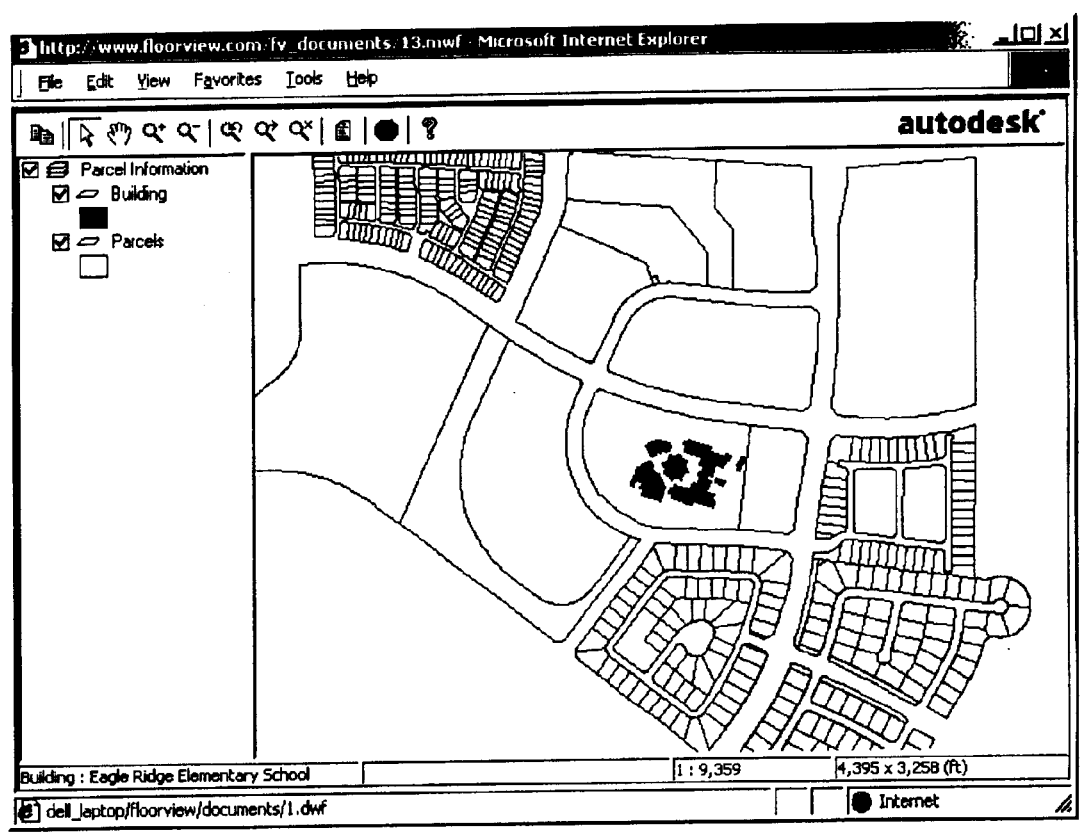
FIG. 20 is a screen capture of a site plan overhead view.
Figure 21:
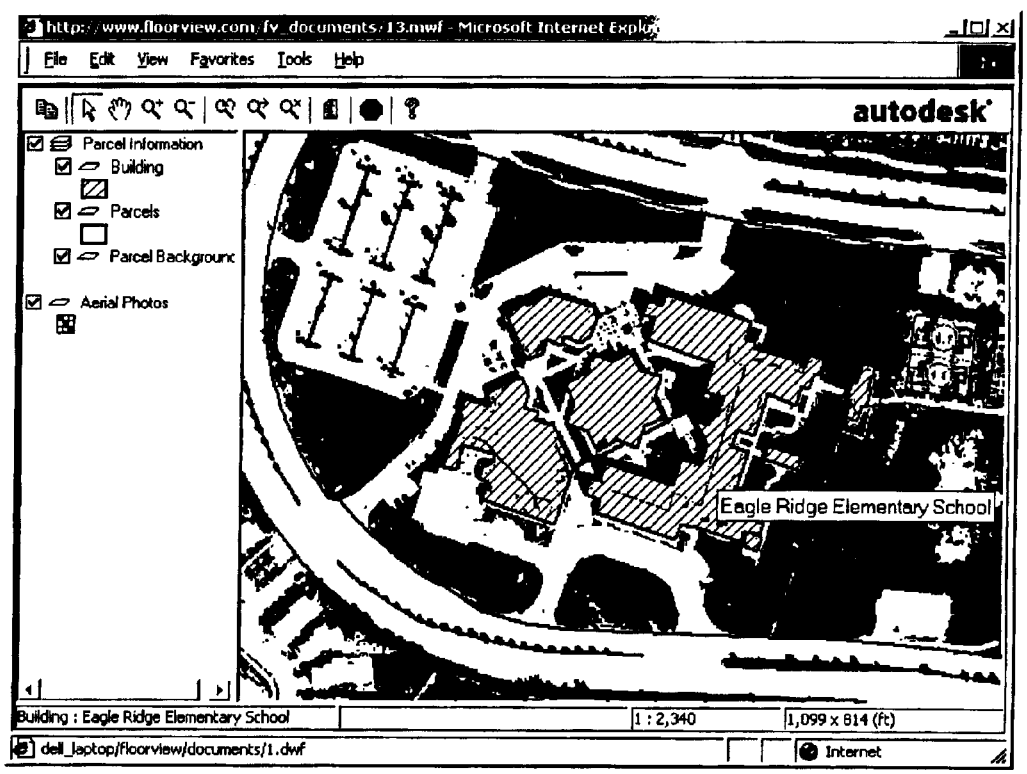
FIG. 21 is a screen capture of a site plan overhead view overlaid with aerial photo data.
Figure 22:
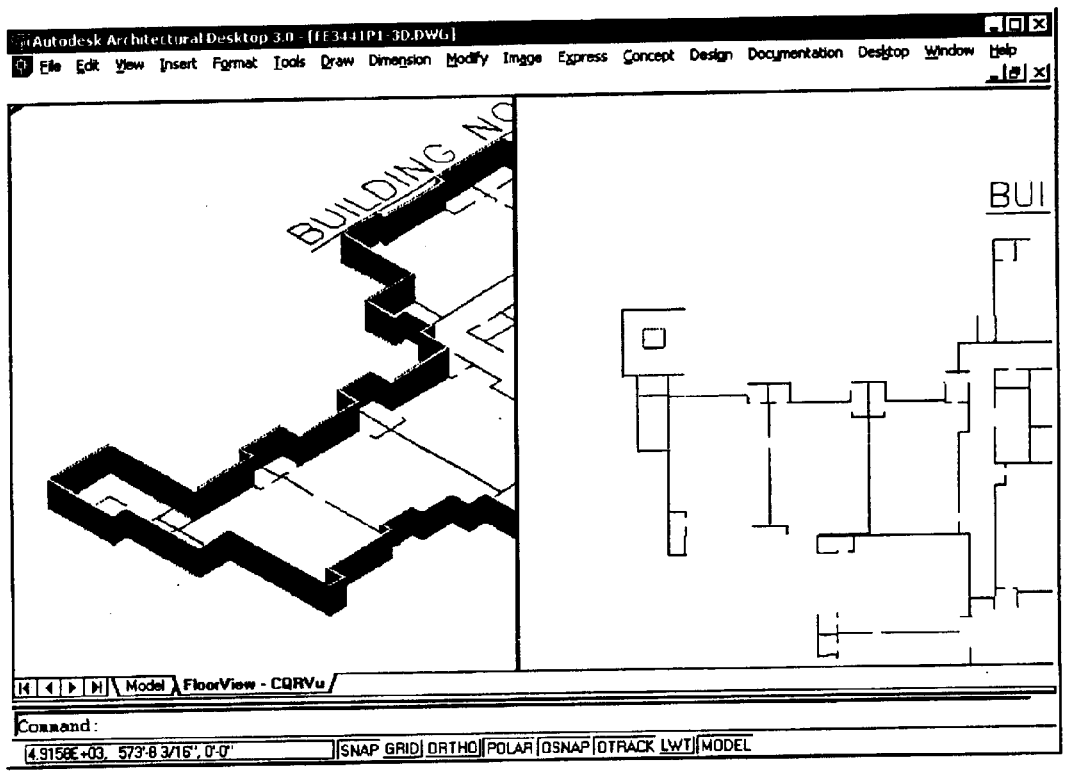
FIG. 22 is a screen capture of an application of AutoDesk Architectural Desktop for standardizing structural plans.
Figure 23:
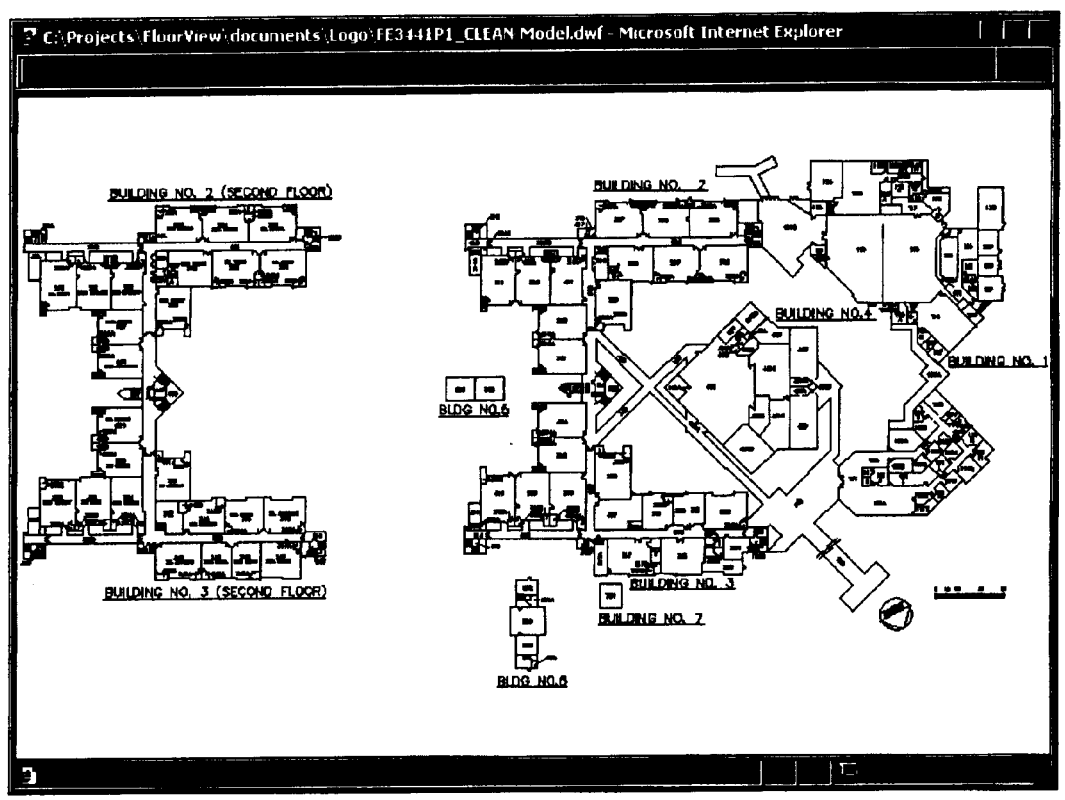
FIG. 23 is a screen capture of structural floor plans as view through a thin client browser interpreting vector data.
Figure 24:
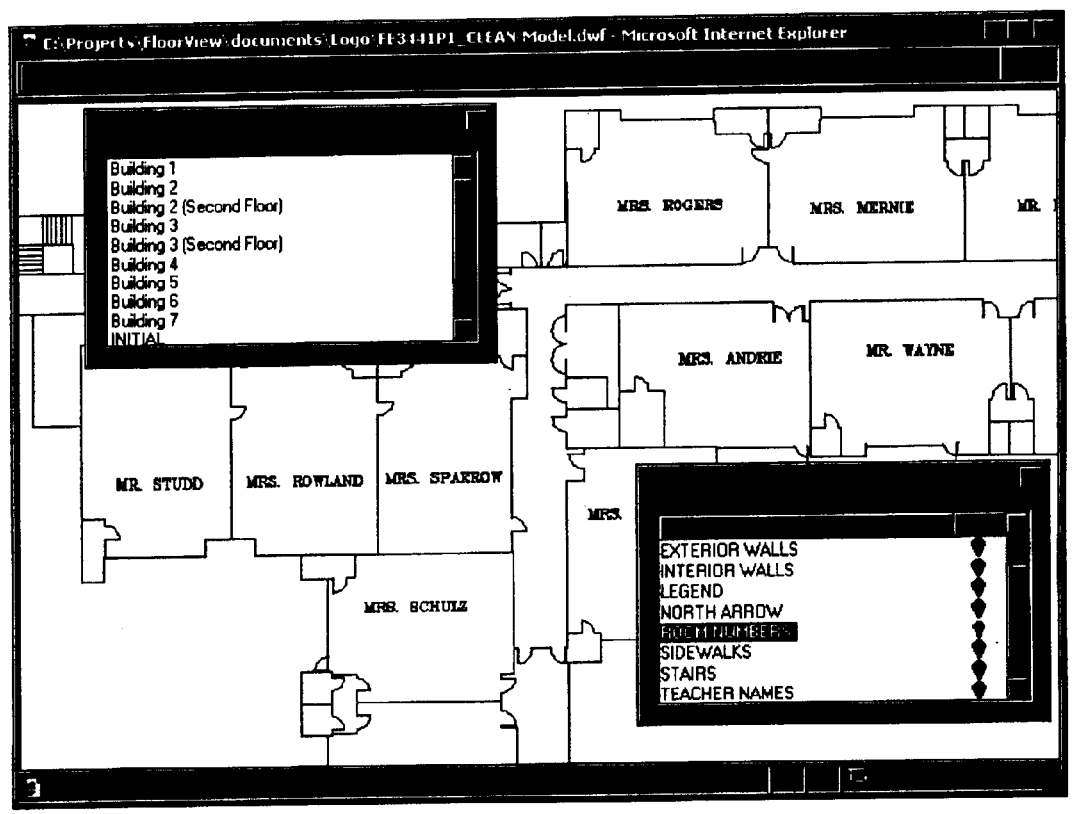
FIG. 24 is a screen capture of structural floor plans with non-modal list boxes for selecting and deselecting viewable structural objects and alphanumeric data.

In FIG. 12, a static web page is posted to a Microsoft Internet Explorer browser window. Although a proprietary client interface may be employed, it is preferred that a standards-compliance browser be employed to afford cross-platform support. In FIG. 13 a login screen is shown to accept an email address, secure ID number and password. In FIG. 14 the login screen is populated with exemplary values. In FIG. 15, a screen displays a successful login as well as the number of schools available for viewing. In FIG. 16 a number of selections are available for viewing including floor plans, site plans, interior photos, exterior photos, faculty information and tactical notes. In FIG. 17, a number of exterior photos are listed for viewing including an outside walkway and front entranceway. In FIG. 18, faculty member information is provided. Tactical notes are shown in FIG. 19. In FIG. 20 a site plan is shown. In FIG. 21, aerial photography is integrated with the site plan of FIG. 20. FIG. 22 shows the construction of a standardized plan using AutoDesk Architectural Desktop. Both three dimensional and two dimensional representations are simultaneously viewable. The construction of the standardized plan utilizes reusable objects which have predefined and uniform properties. FIG. 23 shows a site plan as viewed through a WHIP!® browser plugin. The vector data defined in the *.DWF file requires little bandwidth and may be rendered quickly by the remote client computing device. FIG. 24 shows a floor plan with faculty names associated with each room. A first modal list box provides user selectable display options to show or hide exterior walls, interior walls, legend information, directional arrows, room numbers, sidewalks, stairs, teacher names and the like. A second modal list box permits the end user to jump from one building to another or from floor to floor.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of processing and displaying structural plans responsive to emergency tactical situations, the method comprising the steps of:

receiving a heterogeneous array of structural plan files;

establishing a common specification for displaying structural plans;

transforming the heterogeneous array of structural plan files to a standardized plan according to the common specification;

receiving a remote request for a structural plan relating to a tactical objective; and responsive to the remote request transmitting the standardized plan to a remote recipient.

2. The method of claim 1 further comprising the steps of:

establishing an array of preselected tactical objectives;

establishing an array of relevant objects for each preselected tactical objectives; and filtering the array of relevant objects from the standardized plan according to the tactical objective and transmitting the filtered plan to the remote recipient.

3. The method of claim 1 further comprising the steps of:

establishing an array of reusable structural objects according to the common specification; and constructing the standardized plan with the array of reusable structural objects.

4. The method of claim 3 further comprising the steps of:

associating a tactical strategy with at least one object in the array of reusable structural objects;

generating a tactical recommendation display to the remote recipient responsive to a display of the at least one object.

5. The method of claim 4 further comprising the steps of:

calculating a position of the at least one object relative to other objects; and generating the tactical recommendation display in view of the position.

6. The method of claim 4 further comprising the steps of:

calculating an array of dimensions of the at least one object; and generating the tactical recommendation display in view of the array of dimensions.

7. The method of claim 4 further comprising the steps of:

calculating a position of the at least one object relative to other objects;

calculating an array of dimensions of the at least one object; and generating the tactical recommendation display in view of the position and array of dimensions.

8. The method of claim 4 wherein the tactical strategy is to provide fire cover.

9. The method of claim 4 wherein the tactical strategy is to provide pathways for equipment transport.

10. The method of claim 4 wherein the tactical strategy is to provide utility access.

11. The method of claim 4 wherein the tactical strategy is containment by lockable doors.

12. The method of claim 8 wherein the tactical recommendation display is a gradient rendered over areas of concern.

13. The method of claim 9 wherein the tactical recommendation display comprises warning markers rendered over pathways of insufficient dimensions to transport equipment.

14. The method of claim 9 wherein the tactical recommendation display comprises a rendered trail over at least one pathway of sufficient dimensions to transport equipment.

15. The method of claim 10 wherein the tactical recommendation display comprises markers rendered over utility access points.

16. The method of claim 11 wherein the tactical recommendation display comprises markers rendered over lockable doors.

17. The method of claim 16 further comprising the steps of:

establishing a communications pathway from an onsite display device viewing the standardized plan to a corresponding structural facility being viewed by the display device;

responsive to a selection of at least one lockable door on the display device, transmitting an instruction to the structural facility to engage the lock.

18. The method of claim 17 wherein responsive to a selection of at least one lockable door on the display device, transmitting an instruction to the structural facility to disengage the lock.

19. The method of claim 1 wherein the step of transforming the heterogeneous array of structural plan files to a standardized plan according to the common specification further comprises the step of recording bibliographic data relating to the origin of the heterogeneous array of structural plan files.

20. The method of claim 1 wherein the step of transforming the heterogeneous array of structural plan files to a standardized plan according to the common specification further comprises the steps of:

establishing an array of alphanumeric data related to the structural plan files;

associating the alphanumeric data with the structural plan files; and responsive to the remote request transmitting alphanumeric data in addition to the standardized plan to the remote recipient.

21. The method of claim 20 wherein alphanumeric data is only displayed in context of associated structural plan data.

22. The method of claim 1 further comprising the steps of:

receiving an array of GPS coordinates from at least one person inside a facility of which the standardized structural plans are being viewed; and displaying the at least one person"s position in overlaying relation to the structural plans on a remote display device.

23. The method of claim 22 further comprising the steps of:

monitoring the movement of the at least one person as a function of elapsed time;

establishing a threshold movement value;

periodically calculating a movement value for the at least one person;

responsive to a movement value for the at least one person becoming equal to the threshold movement value, issuing an alert notification.

24. The method of claim 23 further comprising the step of transmitting tactical data relating to a rescue operation for the at least one person.

25. A method of processing and displaying structural plans responsive to emergency tactical situations, the method comprising the steps of:

receiving a heterogeneous array of structural plan files;

establishing a common specification for displaying structural plans;

establishing an array of reusable structural objects according to the common specification;

constructing a standardized plan from the heterogeneous array of structural plan files with the array of reusable structural objects according to the common specification;

establishing an array of preselected tactical objectives;

establishing an array of relevant objects for each preselected tactical objectives;

filtering the array of relevant objects from the standardized plan according to an individual tactical objective;

receiving a remote request for a structural plan relating to a tactical objective; and responsive to the remote request transmitting the standardized plan to a remote recipient.

26. A method of processing and displaying structural plans responsive to emergency tactical situations, the method comprising the steps of:

aggregating an array of data relating to at least one structure;

establishing a common specification for displaying structural plans;

establishing an array of objects according to the common specification;

encapsulating a logic function in at least one object of the array;

formatting the array to the common specification;

storing the array on a remotely accessible storage device;

responsive to a request, transmitting the array to a remotely located display device; and executing the logic function.

27. The method of claim 26 wherein the logic function is responsive to an identified tactical objective.

28. The method of claim 26 wherein the logic function is responsive to GPS data.

29. A computer program product for processing and displaying structural plans responsive to emergency tactical situations comprising:

a computer-readable medium;

a data storage module stored on the medium, that couples to an array of digital files relating to at least one structure;

a data conversion module communicatively coupled to the data storage module to format the array of digital files into a common specification;

a network reception module communicatively coupled to the data storage module to receive requests for the array of digital files; and a network transmission module communicatively coupled to the network reception module to transmit the array of digital files.

30. The computer program of claim 29 further comprising a security module communicatively coupled to the reception module to validate to the identity of the entity requesting the array of digital files.

31. The computer program of claim 29 further comprising a GPS reception module to receive dynamic positioning of a person.

32. The computer program of claim 31 further comprising a GPS monitoring module to monitor the person"s movement as a function of time.

33. The computer program of claim 32 further comprising a GPS alert module to issue an alert if the person fails to move a sufficient distance during a preselected period of time.

34. The computer program of claim 31 further comprising a GPS transmission module to transmit the position of the person relative to the structure defined by the array of digital files.

35. A computer program product for processing and displaying structural plans responsive to emergency tactical situations comprising:

a computer-readable medium;

a data storage module stored on the medium, that couples to an array of digital files relating to at least one structure;

a data conversion module communicatively coupled to the data storage module to format the array of digital files into a common specification;

a network reception module communicatively coupled to the data storage module to receive requests for the array of digital files;

a security module communicatively coupled to the reception module to validate to the identity of the entity requesting the array of digital files;

a GPS reception module to receive dynamic positioning of a person;

a GPS monitoring module to monitor the person"s movement as a function of time;

a GPS alert module to issue an alert if the person fails to move a sufficient distance during a preselected period of time;

a GPS transmission module to transmit the position of the person relative to the structure defined by the array of digital files; and a network transmission module communicatively coupled to the network reception module to transmit the array of digital files.

* * * * *